United States Patent [19]
Gilmore et al.

[11] Patent Number: 5,618,183
[45] Date of Patent: Apr. 8, 1997

[54] DITHER MOTOR CONNECTOR FOR A SELF CONTAINED LASER GYRO

[75] Inventors: Thomas A. Gilmore, Plymouth; Balu K. Iyer, Eden Prairie, both of Minn.

[73] Assignee: Honeywell Inc., Minneapolis, Minn.

[21] Appl. No.: 328,752

[22] Filed: Oct. 24, 1994

[51] Int. Cl.$^6$ .................................................. G01C 19/70
[52] U.S. Cl. ............................................ 439/66; 356/350
[58] Field of Search ..................... 439/66, 74, 91; 361/784, 785; 356/350

[56] References Cited

U.S. PATENT DOCUMENTS

| | | | |
|---|---|---|---|
| 5,173,745 | 12/1992 | Hanse | 356/350 |
| 5,345,366 | 9/1994 | Cheng et al. | 361/785 |

OTHER PUBLICATIONS

IEEE Plans '90 Position Location and NavigationSymposium, "The 1990's–A Decade of Excellence in the Navigation Sciences" dated Mar. 20, 1990.

The CIN::APSE Standard Products document dated 1991.

*Primary Examiner*—Neil Abrams
*Attorney, Agent, or Firm*—Thomas A. Rendos

[57] ABSTRACT

A dither motor connector for a laser gyro which has the power supply and the laser block along with other support electronics within the same housing. A connector unit makes a connection between the power supply and the dither motor 22 through wires 28 in the connector unit. The connector unit 30 includes connector substrates which are joined with a conductive slug 36, connectors 34A–C, feed through printed wiring boards 38, 40 and a paddle board 32 to provide electrical connection from one printed wiring board, through another and to the desired location at the dither motor.

3 Claims, 5 Drawing Sheets

Figure 1

DITHER MOTOR CONNECTOR FOR A SELF CONTAINED LASER GYRO

BACKGROUND OF THE INVENTION

This application is related to U.S. patent application Ser. No. 08/328,754 entitled CONNECTOR FOR A SELF CONTAINED LASER GYRO and U.S. patent application 08/328,755 entitled COMBINED SUPPORT PLATE AND PRINTED WIRING BOARD FOR A SELF CONTAINED LASER GYRO filed on the same day by the same inventors and commonly assigned with the present application.

This invention is directed to the field of laser gyros and more particularly to a laser gyro which is contained in a package with its support electronics.

Laser gyros have attained wide acceptance as high quality, high accuracy navigation devices. Systems which originally used ring laser gyros could occupy an area of four cubic feet or more and generally weighed several pounds.

Such a large system would not work in certain applications, such as missiles and satellites. Only a small, lightweight navigation system will work in these circumstances.

Accordingly, small laser gyro systems have been developed, such as the Honeywell GG1308, which is described in IEEE PLANS 1990, 20 Mar. 1990, pp 528–536 *GG1308 Ring Laer Gyro Inertial Measurement Systems-Honeywell's Low Cost Solution For Tactical Applications*, by J. M. Oelschlaeger and L. O. Thielman. Such a laser gyro has size and weight advantages. But these advantages come at the expense of performance.

Larger gyros, which generally provide better performance, have been previously packaged such that only the laser block itself with any onboard circuitry is packaged within a hermetically sealed container. Other electronics were connected to the laser block, but resided outside the sealed container. Making connections to the block while retaining the seal thus became difficult.

Further some laser gyros employed a dither motor to overcome problems associated with lock-in of the laser beams. These laser gyros also generally included electromechanical pickoff devices. In these laser gyros, a dither drive and pickoff cable assembly was bonded to the laser block. This cable assembly was very delicate and clumsy to handle. The cable assembly sometimes also included other sensitive signal wires which occasionally broke during the gyro build process. Further, the cable assembly, when bonded to the gyro block, caused performance problems due to bending of the laser block.

It therefore became desirable to have a high performing, laser block co-located within the hermetically sealed container with its major support subsytems such as the power supply, path length control circuits, laser intensity monitor circuits and the like. This was to be accomplished while maintaining a small, lightweight system. It was yet a further goal to modify the cable assembly to improve the noted wiring and performance issues.

SUMMARY OF THE INVENTION

The present invention is a dither motor connector unit for a self contained laser gyro. The connector unit includes three connector substrates, a connector slug, contact pads on two circuit boards and a paddle board. Two of the connector substrates are placed on either side of a conductive slug to form a first connector. The first connector is then used to electrically connect the two printed wiring boards. A feed through contact pad on one of the printed wiring boards is then used to connect to another connector substrate and a paddle board. The paddle board provides the final connection to the dither motor. Through this arrangement, a low profile connection from the circuit boards to the dither motor can be made.

DETAILED DESCRIPTION OF THE PREFERRED EMBODIMENT

Figure 1:
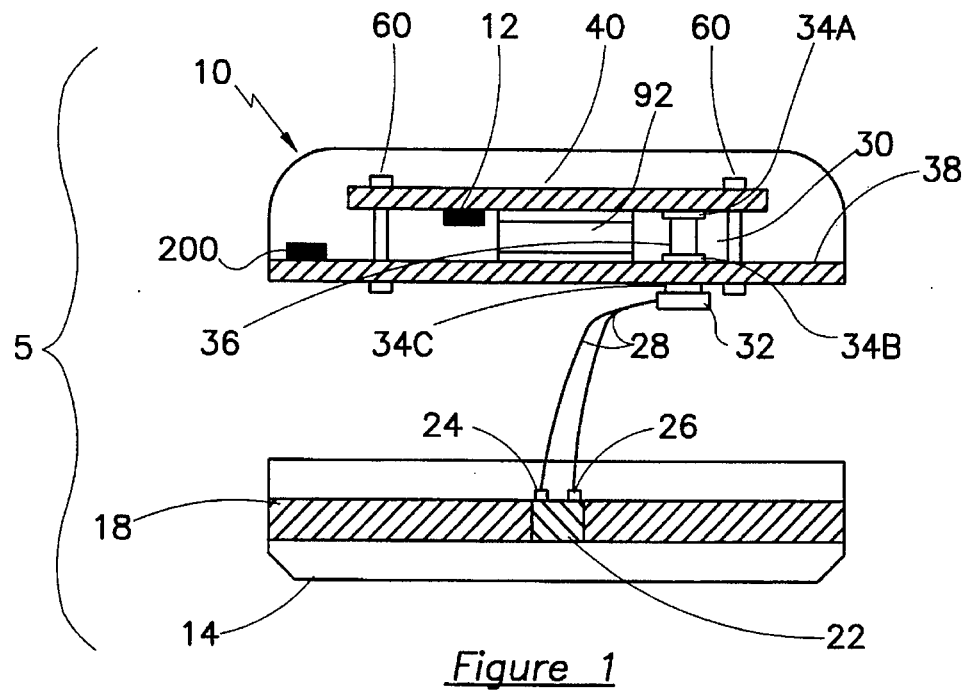
FIG. 1 is a side view of a laser gyro case having a top removed from a bottom.

Referring now to FIG. 1, there shown is a laser gyro unit 5 built using the present invention. The laser gyro unit 5 includes cover 10, power supply 12, base 14, laser gyro 18, dither motor 22, drive piezo 24, pickoff piezo 26, wires 28, paddle board 32, connector unit 92, connector unit 30 which includes three connectors 34, designated 34A, 34B and 34C and slug 36, first printed wiring board 38 and second printed wiring board 40.

Cover 10 contain support electronics printed wiring board 38 and power supply printed wiring board 40. The two printed wiring boards may be connected together by fasteners 60. Generally, one printed wiring board may hold digital support electronics 200 while the other may hold a power supply 12. In the present arrangement, it is preferred that the power supply 12 be located on printed wiring board 40. The power supply provides power for the laser gyro and the dither motor 22, among others. In order to get the power from the power supply printed wiring board 40 to the dither motor 22 and the digital electronics printed wiring board 38, the inventive connector units 92 and 30 along with the connectors 34A, 34B, and 34C and paddle board 32 were developed.

Figure 1A:
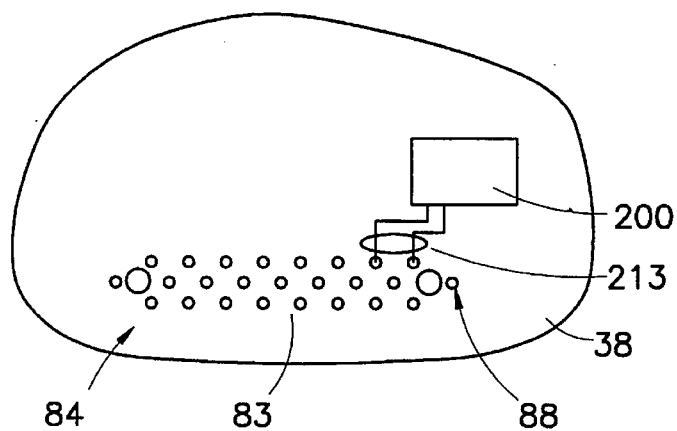
FIG. 1A is a top view of a first printed wiring board shown in FIG. 1.

In FIG. 1A, a top view of the digital electronics printed wiring board 38 is shown. Only elements necessary for purposes of this description have been shown. Printed wiring board 38 has support electronics 200 connected by conductive paths 213 to conductive pattern 84 which includes conductive pads 83, and holes 88. The conductive pads 83 are preferably made from gold. The bottom of the printed wiring board has at least some of the conductors laid out in a similar pattern and the conductors which show up on the bottom in fact pass through the printed wiring board.

Figure 1B:
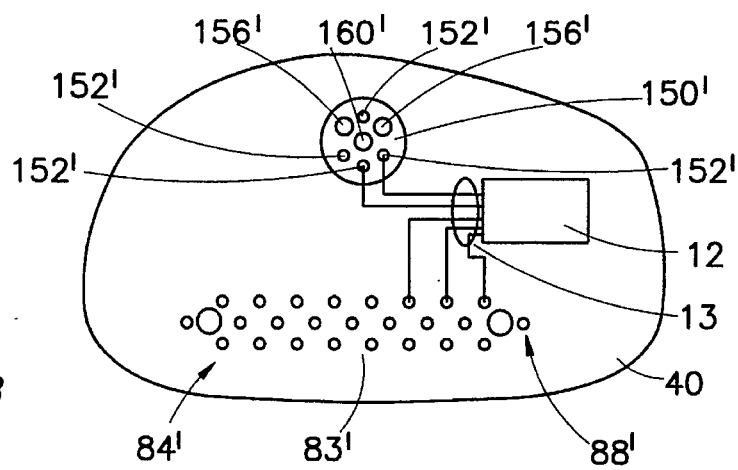
FIG. 1B is a bottom view of a second printed wiring board.

FIG. 1B shows the power supply wiring board 40. Note from FIG. 1A that printed wiring board 38 may be substantially identical to the printed wiring board 40 details shown except that the conductive pad pattern 84 need not pass through printed wiring board. Power supply 12 is connected by conductive paths 13 to at least two of the conductive pads 152' of contact pad 150' which also includes holes 156' and hole 160'. Looking at FIG. 1, 1A and 1B, the power supply 12 is also connected to the conductive pad pattern 84' which is connected to another connector unit 92 which completes the power supply path. The power supply path starts with the power supply 12 through the conductive paths 13 to the conductive pad 83' in the power supply wiring board 40. The power then goes from the conductive pads 83' through a connector unit 92 to conductive pads 83 of the digital electronics wiring board 38 in which the power then travels to the digital electronics 200 through the conductive paths 213.

Figure 2:
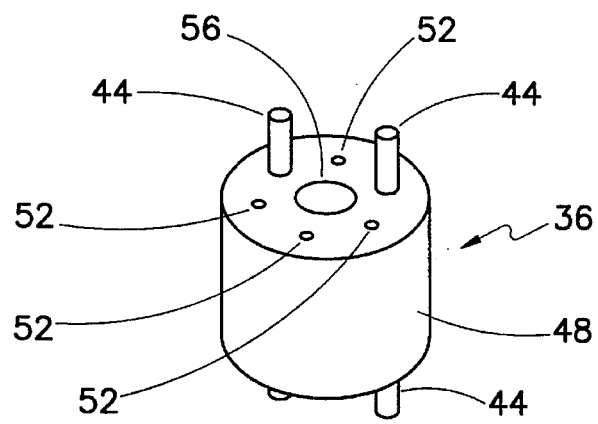
FIG. 2 is a perspective view of a substrate slug.
Figure 3:
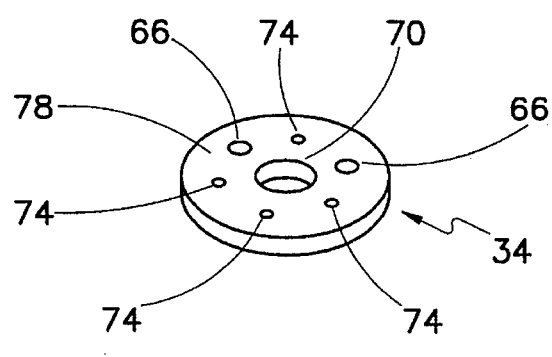
FIG. 3 is a perspective view of a connector substrate.

As can be seen with further reference to FIGS. 2 and 3, Connector unit 30 includes two connectors 34A and 34B and a slug 36. Slug 36 includes a body 48, rods 44 conductors 52 and hole 56. The body 48 is shown here as a cylinder made of a dielectric materials such as glass filled polyester or plastic. Conductors 52 are formed through the body and correspond to a pattern of contacts (see for example FIG. 4) located on the printed wiring boards. The conductors may be inserted into the body and are made of a material with good electrical conductance such as copper with gold plating. Rods 44 are inserted into the body 48 to allow for easy alignment of the slug 36 with the connectors 34 and the printed wiring boards 38 and 40.

Figure 1C:
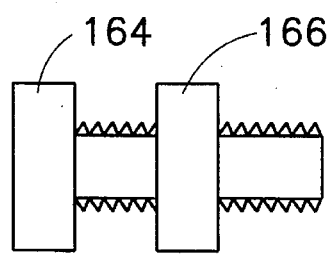
FIG. 1C is a side view of a nut and bolt.
Figure 1D:
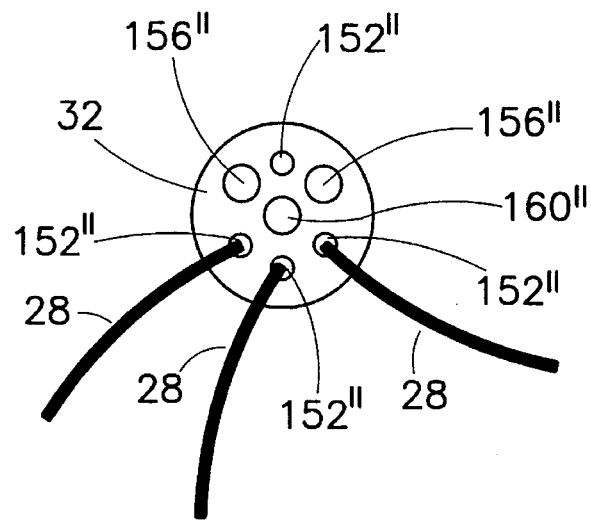
FIG. 1D is a top view of a paddle board.

The connectors 34, which are also known as CIN::APSE™ connectors, can be obtained from Cinch Connectors, 1500 Morse Avenue, Elk Grove Village, Ill. 60007. The connectors include a body 78, locating holes 66, conductors 74 and screw hole 70. The conductors are inserted into holes bored or molded in the body 78. A preferred conductor material is molybdenum plated with nickel and gold. As shown in FIGS. 1, 1A,B, 2 and 3, Holes 66 are arranged to mate with rods 44, conductors 74 are arranged to connect to conductors 52 and conductive pads 152' and holes 70 are intended to match with holes 160' and 56. When assembled as shown in FIG. 1, a fastener such bolt 164 of FIG. 1C, may be placed through holes 70, 160, 160' and 56 and a nut attached and tightened to cause compression of the connectors 34, slug 36 and contact pads 150' such that a good electrical connection is formed.

Referring now to FIG. 1D, 1, 2, and 3, there shown is a paddle board 32. The paddle board may simply be a small printed wiring board which has a contact pattern similar to connector 34. The paddle board 32 includes wires 28 to make the final connection between the power supply 12 and the dither motor 22 and between the dither pickoff 26 and processing electronics 200. The paddle board has conductive pads 152" and holes 156" and 160" to match up with the conductors 52, 74 and rods 44 and holes 56, 70 respectively of the connector unit 30 to form a good electric connection.

Figure 4:
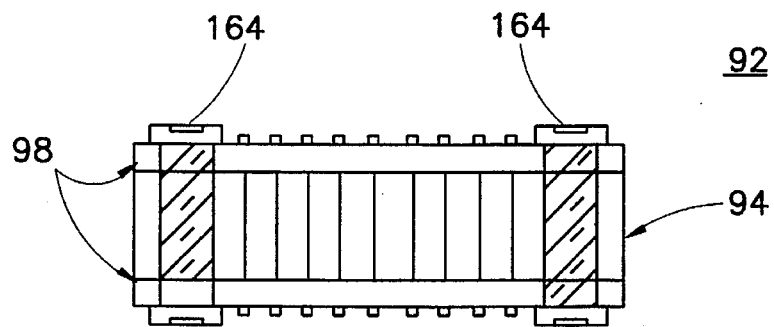
FIG. 4 is a side view of the printed wiring board connector of the present invention.

Referring now back to FIGS. 1A and B and to FIG. 4, the printed wiring boards also include conductive pads 83, 83'. These pads 83, 83' are used to supply power from the power supply 12 through conductive paths 13 to the conductive pad 83' in the power supply wiring board 40. The power then goes form the conductive pads 83' through a connector unit 92 shown in FIG. 4 to conductive pads 83 of the digital electronics wiring board 38 of FIG. 1A in which the power then travels through the conductive paths 213 to the support electronics 200 which reside on the first printed wiring board 38. In order to connect the two printed wiring boards, the connector unit 92 was developed. Connector unit 92 includes connector substrates 98 and slug 94. The support electronics may include, for example, well known dither stripper, random drift improvement or laser intensity monitor electronics.

Figure 4A:
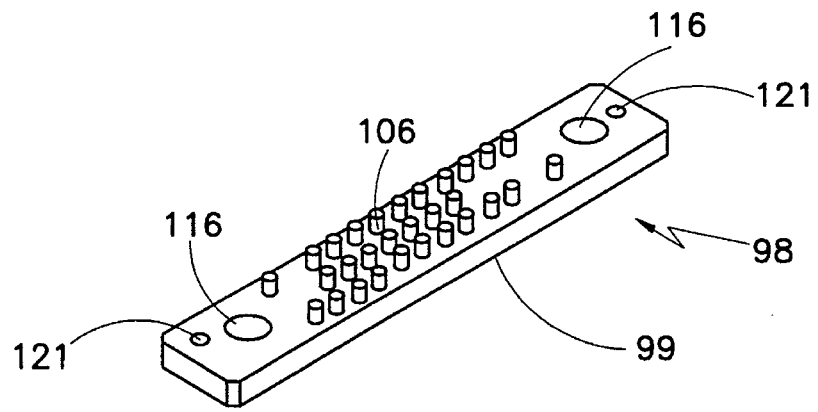
FIG. 4A is a perspective view of a connector substrate.

FIG. 4A shows a connector substrate 98 which includes body 99, conductors 106, screw holes 116 and locating holes 121. Conductors 106, which are made from a material such as molybdenum coated with nickel and gold, extend through the body 99 and above the surface of the body by a small amount such as 5 mm. Holes 116 extend through the body and are used with fastener 164 to hold together the connector unit 92. Holes 121 are used for alignment. Such connectors are also available from Cinch Connectors.

Figure 5:
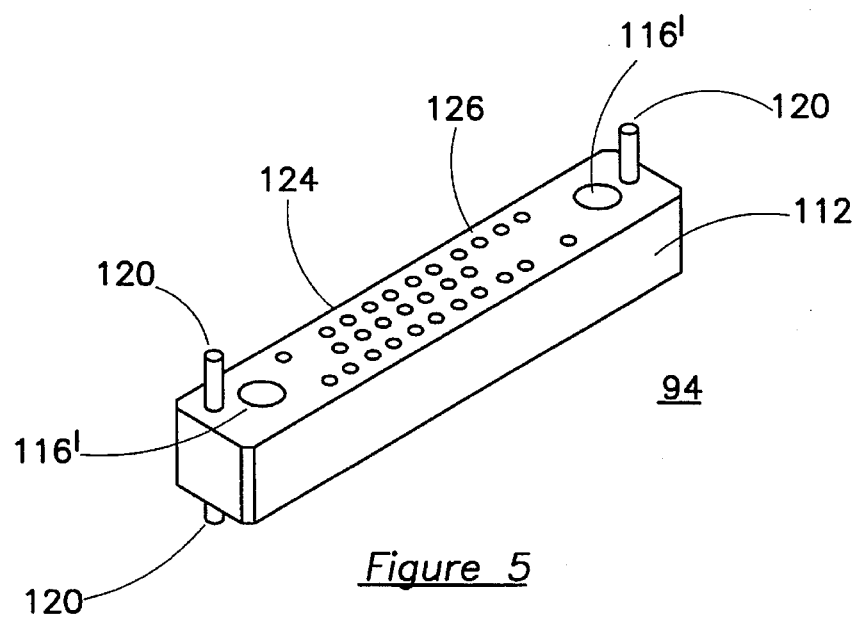
FIG. 5 is a perspective view of the substrate slug of the printed wiring board connector of FIG. 4.

Looking at FIG. 4A with FIG. 5, a slug 94 is shown which has a body 112 and a conductive pattern 124 of conductors 126 similar to the conductor pattern of 106 the connector substrate 98. Conductors 126 are preferably of a conductor such as copper and plated with nickel and golds so that the conductors 106 of the substrate may penetrate into the soft gold plating of the slug to make a good electrical connection. Rods 120 are inserted into holes 121 of the connector substrate 98 to ensure proper alignment. Holes 116' are matched up with the holes 116 of the connector substrate 98 so that a fastener 164 can be used to hold the connector unit 92 together.

Figure 6:
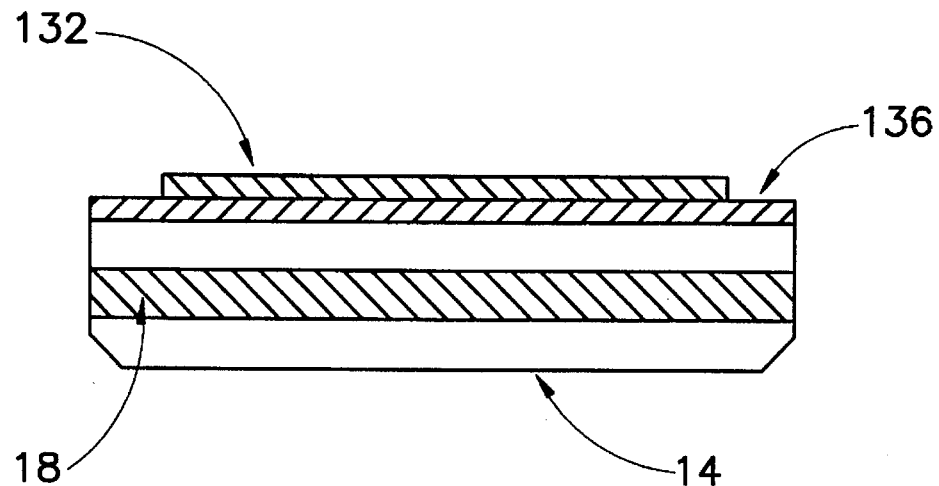
FIG. 6 shows a first embodiment of an inventive combined printed wiring board-support plate.
Figure 7:
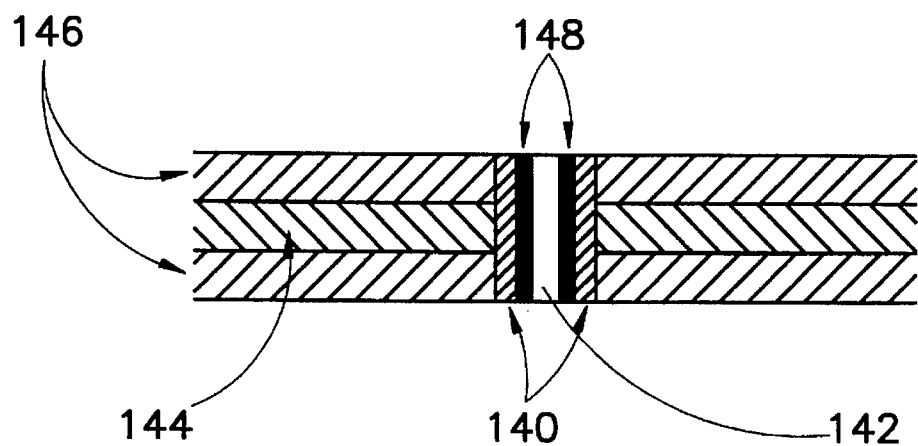
FIG. 7 shows a second embodiment of a combined printed wiring board-support plate.
Figure 8:
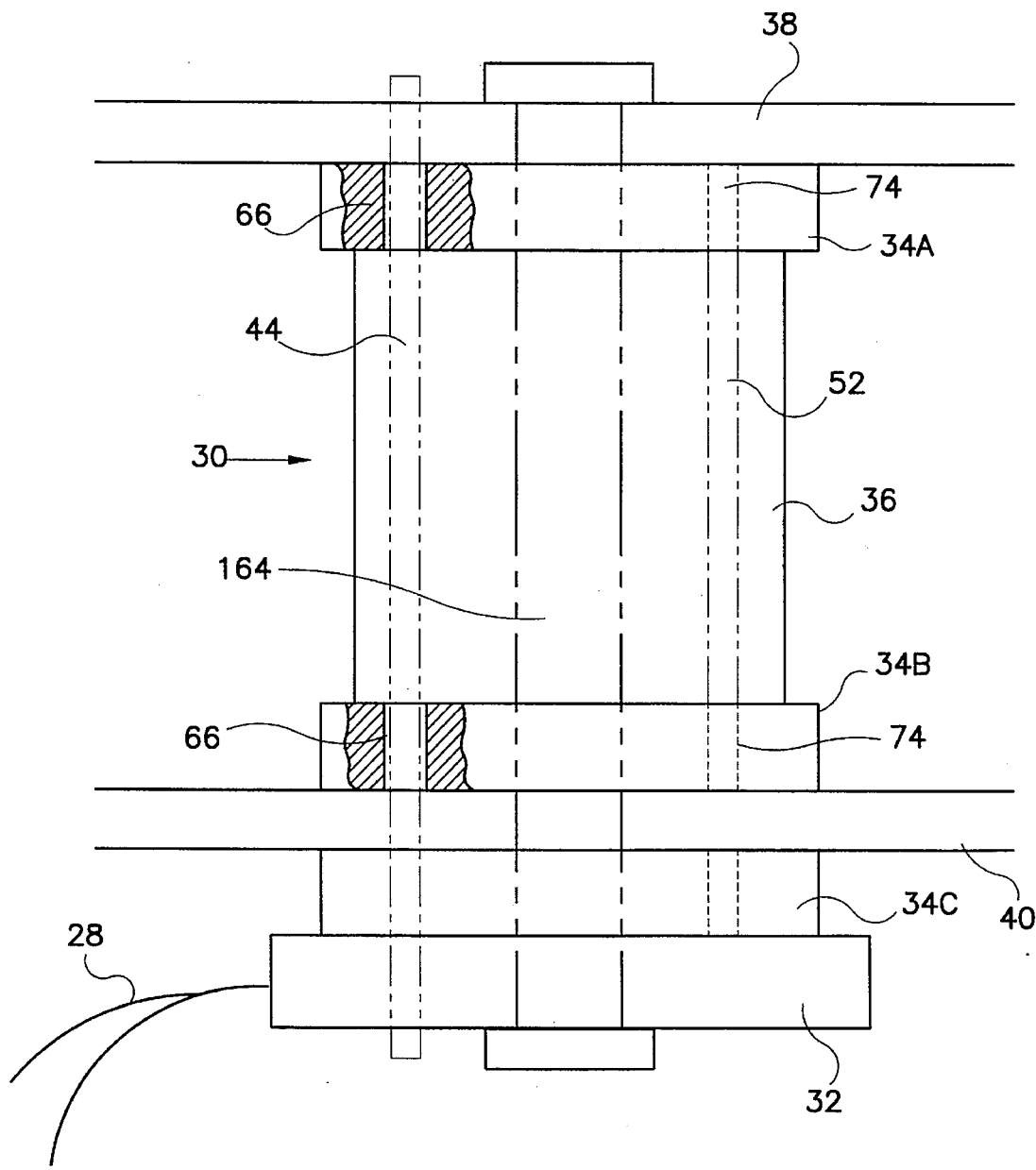
FIG. 8 shows a detail view of a connector unit.

While placing all of the above equipment in a small package is beneficial, certain structural requirements must still be met for the package, such as rigidity. Referring now to FIG. 6, there shown is a laser gyro 18 in a base with a circuit board 132/support plate 136. The combined circuit board/support plate provides the necessary structural rigidity while providing a further location within the package for locating electronics. In a second embodiment of the combined circuit board/support plate shown in FIG. 7, a metal core 144 is coated with a dielectric material 146. A hole 142 may be formed through the plate, coated with the dielectric material and then with a conductive material such as a copper plate. The metal core may be aluminum, and the dielectric material may be an epoxy. FIG. 8 shows a more detail view of the connector unit 30. As described above, the connector unit 30 provides a connection between the digital electronics wiring board 38 and the power supply wiring board 40. A fastener 164 holds the connector unit 30 together with the wiring boards 38 and 40. The connector unit 30 includes a slug 36, connectors 34A, 34B, and 34C, and a paddle board 32 which has wires 28 extending forth for connection with the dither motor 22 (shown in FIG. 1). Also, rods 44 are used to align the slug, 36, the connectors 34A, 34B, and 34C with the wiring boards 38 and 40 so that the conductive paths 52 will be straight.

The foregoing has been a description of a novel and non-obvious housing for a laser gyro. The description is meant by way of example, not limitation. The applicants define their invention through the claims appended hereto.

We claim:

1. In a laser gyro system having a laser gyro, a case, a power supply and first and second printed wiring boards having first and second surfaces, the first printed wiring board having a contact pad having a first pattern of conductors on its first side the second printed wiring board having a contact pad having conductors in said first pattern, at least some of which extend there through from its first side to its second side to form a second pattern of conductors which may be substantially similar to the first pattern of conductors, the laser gyro having a dither motor, a connector unit for connecting the power supply to the dither motor, comprising:

first and second connector substrates each having conductors in said first pattern;

a slug having conductors in said first pattern interposed between said first and second connector substrates;

a third connector substrate having conductors in said second pattern;

a paddle board having conductors in said second pattern, a plurality of which are connected to wires;

wherein said substrates and slug are physically joined to form the connector unit which is interposed between the contact pads of the first and second printed wiring boards such that the pattern of conductors on the connector unit contacts the contact pads; and wherein said third connector substrate is connected to the contact pad on the second side of the second printed wiring board and to the paddle board, the paddle board wires being adapted to connect to the dither motor.

2. The connector unit of claim 1, wherein:

the first and second substrates include keying holes; and the slug includes rods adapted to fit into the keying holes.

3. The connector unit of claim 1, wherein said first, second and third connector substrates, said slug and said paddle board include a screw hole into which a fastener may be inserted.

* * * * *